United States Patent
Lim et al.

(10) Patent No.: US 6,240,099 B1
(45) Date of Patent: May 29, 2001

(54) MULTI-USER CODE DIVISION MULTIPLE ACCESS RECEIVER

(75) Inventors: Teng Joon Lim; Lars Rasmussen; Hiroki Sugimoto, all of Singapore (SG)

(73) Assignees: National University of Singapore; Oki Techno Centre (Singapore) Pte. Ltd., both of Singapore (SG)

( * ) Notice: Subject to any disclaimer, the term of this patent is extended or adjusted under 35 U.S.C. 154(b) by 0 days.

(21) Appl. No.: 09/039,739

(22) Filed: Mar. 16, 1998

(30) Foreign Application Priority Data

Aug. 26, 1997 (SG) .................................................... 9703052

(51) Int. Cl.[7] .................................................. H04B 7/216

(52) U.S. Cl. ........................................ 370/441; 370/342

(58) Field of Search ..................................... 370/441, 320, 370/329, 335, 508, 328, 467, 479; 6/341, 342, 432, 441, 479; 375/130, 136, 139, 140, 152; 0/142, 143, 144, 148, 150, 332, 333, 334, 339

(56) References Cited

U.S. PATENT DOCUMENTS

| | | | |
|---|---|---|---|
| 5,218,619 | 6/1993 | Dent ...................................... | 370/209 |
| 5,363,403 | 11/1994 | Schilling et al. ..................... | 370/441 |
| 5,394,434 | 2/1995 | Kawabe et al. ...................... | 370/342 |
| 5,467,368 | 11/1995 | Takeuchi et al. ..................... | 375/148 |
| 5,579,304 | 11/1996 | Sugimoto et al. .................... | 370/342 |
| 5,737,327 | * 4/1998 | Ling et al. ............................ | 370/335 |
| 5,881,097 | * 3/1999 | Lilleberg et al. ..................... | 375/138 |
| 5,937,014 | * 8/1999 | Pelin et al. ........................... | 375/346 |
| 5,978,413 | * 11/1999 | Bender ................................. | 375/149 |
| 5,987,014 | * 11/1999 | Magill et al. ......................... | 370/335 |
| 6,009,089 | * 12/1999 | Huang et al. ......................... | 370/342 |
| 6,034,986 | * 3/2000 | Yellin .................................... | 375/346 |

FOREIGN PATENT DOCUMENTS 0 717 505 A2 6/1996 (EP).
WO 94/28642 12/1994 (WO).

OTHER PUBLICATIONS

Mamoru Sawahashi, Hidehiro Andoh, and Kenichi Higuchi, "DS–CDMA Pilot and Data Symbol–Assisted Coherent Multistage Interference Canceller Using Repeatedly Updated Channel Estimation," *IEEE, ICCS/ISPACS,* '96, pp. 585–589.

(List continued on next page.)

*Primary Examiner*—Dang Ton
*Assistant Examiner*—Phirin Sam
(74) *Attorney, Agent, or Firm*—Klarquist Sparkman Campbell Leigh & Whinston, LLP (57) ABSTRACT

A receiver and method for receiving a code-division multiple-access (CDMA) signal combining symbol values spread by a plurality of spreading codes, which method comprises the steps of:

(a) converting the CDMA signal to a baseband signal;
(b) recognizing symbol boundaries in every multipath for every user in the baseband signal to produce a delay estimate;
(c) estimating an attenuation and phase rotation impressed on the signal by each multipath to produce channel estimates;
(d) generating new symbol estimates for every user at a sampling rate that is greater than a symbol rate of the signal;
(e) generating an estimate of the received signal using said symbol estimates and channel estimates;
(f) comparing the received signal with its estimate and feeding estimation error back to a means for estimating the transmitted symbols;
(g) sampling the symbol estimates at the estimated symbol boundaries of each user to obtain final symbol estimates; and
(h) repeating steps (b) through (g) with every new sample.

17 Claims, 6 Drawing Sheets

OTHER PUBLICATIONS

Pulin Patel and Jack Holtzman, "Analysis of a Simple Successive Interference Cancellation Scheme is a DS/CDMA System," IEEE Journal on Selected Areas in Communications, vol. 12, No. 5, Jun. 1994, pp. 796–807.

Sergio Verdú, "Adaptive Multiuser Detection," Code Division Multiple Access Communications, Printed in the Netherlands, 1995, pp. 97–116.

Dariush Divsalar and Marvin Simon, "Improved CDMA Performance Using Parallel Interference Cancellation," *JPL Publication*,California Institute of Technology, 95–21, Oct. 1995, pp. 1–57, plus appendices.

Mahesh K. Varanasi and Behnaam Aazhang, "Multistage Detection in Asynchronous Code–Division Multiple–Access Communications," *IEEE Transactions on Communications,* vol. 38, No. 4, Apr. 1990, pp. 509–519.

Lei Wei, Lars K. Rasmussen and Richard Wyrwas, "Near Optimum Tree–Search Detection Schemes for Bit–Synchronous Multiuser CDMA Systems over Gaussian and Two–Path Rayleigh Fading Channels," *Paper Submitted to IEEE Transactions on Communications,* pp. 1–24.

Laurie B. Nelson and H. Vincent Poor, "Iterative Multiuser Receivers for CDMA Channels: An EM–Based Approach," *IEEE Transactions on Communications,* vol. 44, No. 12, Dec. 1996, pp. 1700–1710.

Ruxandra Lupas and Sergio Verdu, "Linear Multiuser Detectors for Synchronous Code–Division Multiple–Access Channels," *IEEE Transactions on Information Theory,* vol. 35, No. 1, Jan. 1989, pp. 123–136.

Zhenhua Xie, Craig K. Rushforth and Robert T. Short, "Multiuser Signal Detection Using Sequential Decoding," *IEEE Transactions on Communications,* vol. 38, No. 5, May 1990, pp. 578–583.

Sergio Verdú, "Minimization Probability of Error for Asynchronous Gaussian Multiple–Access Channels," *IEEE Transactions on Information Theory,* vol. IT–32, No. 1, Jan. 1986, pp. 85–96.

Zhenhua Xie, Robert T. Short and Craig K. Rushforth, "A Family of Suboptimum Detectors for Coherent Multiuser Communications," *IEEE Journal on Selected Areas in Communications,* vol. 8, No. 4, May 1990, pp. 683–690.

Dao Sheng Chen and Sumit Roy, "An Adaptive Multiuser Receiver for CDMA Systems," *IEEE Journal on Selected Areas in Communications,* vol. 12, No. 5, Jun. 1994, pp. 808–816.

Michael Honig and Sergio Verdú, "Blind Adaptive Multiuser Detection," *IEEE Transactions on Information Theory,* vol. 41, No. 4, Jul. 1995, pp. 944–960.

Scott L. Miller, "An Adaptive Direct–Sequence Code–Division Multiple–Access Receiver for Multiuser Interference Rejection," *IEEE Transactions on Communications,* vol. 43, No. 2/3/4, Feb./Mar/Apr. 1995, pp. 1746–1755.

Upamanyu Madhow and Michael L. Honig, "MMSE Interference Suppression for Direct–Sequence Spread–Spectrum CDMA," *IEEE Transactions on Communications,* vol. 42, No. 12, Dec. 1994, pp. 3178–3188.

Teng Joon Lim and Lars K. Rasmussen, "Adaptive Symbol and Parameter Estimation in Asynchronous Multiuser CDMA Detectors," *IEEE Transactions on Communications,* vol. 45, No. 2, Feb. 1997, pp. 213–220.

* cited by examiner

MULTI-USER CODE DIVISION MULTIPLE ACCESS RECEIVER

BACKGROUND OF THE INVENTION

THIS INVENTION relates to a multi-user code division multiple access receiver based on recursive estimation. More particularly the division relating to a method of receiving a code-division multiple-access signal.

Code division multiple access (or CDMA) cellular communications systems suffer from co-channel interference (or multi-user or multiple-access interference [MAI]) on the reverse or up link (i.e. from a mobile handset to a base station). This is due to the impossibility of maintaining orthogonality between code channels used by independent mobile handsets, which transmit asynchronously. This form of interference limits the uplink capacity severely, and very significant capacity gains can be achieved if multi-user interference can be reduced, or if joint detection of all users is employed, as opposed to conventional single-user detection techniques currently in use which merely treat multiple-access interference (MAI) as uncorrelated noise.

Previous work on MAI cancellation dates back to S. Verdú, "Minimum probability of error for asynchronous Gaussian multiple-access channels," IEEE Trans. Inf. Theory, vol. 32, no. 1, pp. 85–96, January 1986, which describes the use of a Viterbi decoder in concert with a maximum-likelihood (ML) decoding metric for the demodulation of the bits transmitted by each user. The maximum-likelihood detector has a complexity which increases exponentially—in a binary phase shift keyed (BPSK) system, this is of the order of $2^k$ multiply-and-add's, K being the number of users in the system. Its complexity prevents the practical implementation of the ML detector, and thus other sub-optimal schemes have been proposed.

Among these, direct descendants of Verdú's ML detector are the sequential decoder discussed in Z. Xie, C. K. Rushforth, and R. T. Short, "Multi-user signal detection using sequential decoding," IEEE Trans. Communications, vol. 38, no. 5, pp. 578–583, May 1990, and a limited tree-search detector discussed in L. Wei, L. K. Rasmussen, and R. Wyrwas, "Near-optimum tree-search detection schemes for bit-synchronous multi-user CDMA systems over Gaussian and two-path Rayleigh fading channels," IEEE Trans. Communications, Vol. 45, No. 6, pp. 691–700, June 1997, which operate on the principle of searching the decoding tree structure non-exhaustively, as opposed to the ML algorithm which examines every branch of the tree. The complexity of such schemes is still fairly large, and their structure is more suited to a programmable digital signal processor (DSP) implementation than a large-scale integrated (LSI) circuit one. Present DSP's are still not powerful enough to implement the tree-search family of multi-user detectors.

The conventional detector passes the received signal through a filter bank, each branch of which is matched to the spreading code of one user. The K outputs of the filter bank are then passed through K decision devices (or slicers) which decide on the symbols that were transmitted. This simple technique suffers from MAI as described earlier, but an additional matrix filter based on the cross-correlations between the spreading codes used by individual users can be designed to remove MAI completely. This detector structure is known as the decorrelating detector and was proposed in R. Lupas and S. Verdú, "Linear multi-user detectors for synchronous code-division multiple-access channels," IEEE Trans. Inf. Theory, vol. 35, no. 1, pp. 123–136, January 1989.

The problems with the decorrelating detector are that:
1. when long spreading codes with periods greater than the symbol interval are used, the matrix filter has to be re-calculated in every symbol. This is a non-trivial operation requiring the inversion of a K×K matrix;
2. with long codes, there is a non-zero probability that in a given symbol interval, the codes selected by the K users will not form a linearly independent set. This would be fatal to the decorrelating detector; and
3. The decorrelating detector removes MAI without regard for noise and interference from other sources, and can be shown always to increase the noise component not due to MAI. This noise enhancement problem is a characteristic of zero-forcing filters such as the decorrelating detector.

The first two problems are almost impossible to overcome due to the very concept of the decorrelating detector, which is to invert the channel matrix in order to recover the transmitted signal vector.

The noise enhancement problem can be limited using the same technique as in channel equalisation, namely the use of a minimum mean squared error (MMSE) solution. This was proposed in Z. Xie, R. T. Short, and C. K. Rushforth, "A family of sub-optimum detectors for coherent multi-user communications," IEEE J. Sel. Areas Comms., vol. 8, no. 4, pp. 683–690, May 1990, and further explored in U. Madhow and M. L. Honig, "MMSE interference suppression for direct-sequence spread-spectrum CDMA," IEEE Trans. Communications, vol. 42, no. 12, pp. 3178–3188, December 1994. The MMSE detector also in theory requires a matrix inversion, and in addition to knowledge of spreading codes, also requires knowledge of the thermal noise power at the receiver. This may seem impractical, but the amount of side information required can be reduced to merely a training sequence when an adaptive implementation is applied. This approach is expounded in, for example, S. L. Miller, "An adaptive direct-sequence code-division multiple-access receiver for multi-user interference rejection," IEEE Trans. Communications, vol 43, no. 2/3/4, pp. 1746–1755, February/March/April 1995, S. Verdú, "Adaptive multi-user detection," in Code Division Multiple Access Communications, S. G. Glisic and P. A. Leppanen, Eds., pp. 97–116, Kluwer Academic Publishers, The Netherlands, 1995, and a blind approach not requiring the use of training symbols has also been proposed in M. Honig, U. Madhow, and S. Verdú, "Blind adaptive multi-user detection," IEEE Trans. Inf. Theory, vol. 41, no. 4, pp. 944–960, July 1995.

The adaptive MMSE detector however suffers from one major drawback in that it can only be used for short-code systems, i.e., those which use spreading codes with periods exactly equal to one symbol interval. Such systems do not currently exist and are not under consideration for future cellular systems because of the need to have codes long enough to uniquely identify every single mobile handset in use at one time around the world.

Another family of multi-user detectors works on the principle of interference cancellation through progressive subtraction of estimated interference components from the received signal. The successive interference canceller (SIC) as discussed in P. Patel and J. Holtzmann, "Analysis of simple successive interference cancellation scheme in a DS/CDMA system," IEEE J. Sel. Areas Comms., vol. 12, no. 5, pp. 796–807, June 1994, and the parallel interference canceller (PIC) discussed in M. K. Varanasi and B. Aazhang, "Multi-stage detection in asynchronous code-division multiple-access communications," IEEE Trans. Communications, vol. 38, no. 4, pp. 509–519, April 1990, are well known and many improvements have been made to the basic structures. Notable ones include hybrid serial-parallel structures as discussed in M. Sawahashi, H. Andoh and K. Higuchi, "DS-CDMA pilot and data symbol-assisted coherent multistage interference canceller using repeatedly updated channel estimation," in the Proc. IEEE Int'l Conf. Comm. Systems (ICCS)/Int'l Wkshop Intelligent Sig. Proc. & Comm. Systems (ISPACS), Singapore, November 1996, pp. 585–589 and the use of tentative decisions at the output of each stage instead of hard decisions as discussed in U.S. Pat. No. 5,579,304 and D. Divsalar and M. Simon, "Improved CDMA performance using parallel interference cancellation," Tech. Rep. 95–21, Jet Propulsion Lab., California Inst. of Tech., October 1995. The linear clipper soft-decision function in particular produces quite spectacular improvements in performance over the hard-decision SIC, as shown in X Zhang and D. Brady, "Soft-decision multistage detection for asynchronous AWGN channels", in the Proc. 31st Annual Allerton Conf. Comms., Cont. & Comp., Monticello, Ill., 1993 and for another algorithm in L. B. Nelson and H. V. Poor, "Iterative multi-user receivers for CDMA channels: an EM-based approach," IEEE Trans. Communications, vol.44, No. 12, pp.1700–1710, December 1996.

Various forms of the subtractive interference canceller are disclosed in U.S. Pat. No. 5,579,304; 5,218,619; 5,467,368; and 5,363,403.

Due to the large number of different types of multi-user CDMA detectors which have been proposed, it is quite a task to rank them according to performance beyond noting that the ML detector performs best while the conventional detector performs worse. Therefore, we do not claim that this invention performs better than all other multi-user CDMA detectors, only that against a similar detector described in D. S. Chen and S. Roy, "An adaptive multi-user receiver for CDMA systems" IEEE J. Sel. Areas Comms., vol. 12, no 5, pp. 808–816, June 1994, it does perform a lot better and against a four-stage linear-clipper SIC, performance is comparable as will be demonstrated later.

In D. S. Chen and S. Roy, "An adaptive multi-user receiver for CDMA systems" IEEE J. Sel. Areas Comms., vol. 12, no 5, pp. 808–816, June 1994, a detector which operates on the basis of recursive least squares (RLS) weight updating and the concept of regenerating the received signal based on known spreading codes and channel coefficients was described. The channel model used is similar to the one described herein, but it assumes synchronous transmission, i.e., all users' symbol intervals are synchronized, whereas this invention explicitly includes asynchronous systems. Also, the weight up-dating algorithm described herein differs from the RLS algorithm used in D. S. Chen and S. Roy, "An adaptive multi-user receiver for CDMA systems" IEEE J. Sel. Areas Comms., vol. 12, no 5, pp. 808–816, June 1994.

In T. J. Lim and L. K. Rasmussen, "Adaptive symbol and parameter estimation in asynchronous multi-user CDMA detectors", IEEE Trans. Communications, vol. 45, no. 2, pp. 213–220, February 1997, a joint parameter estimation and bit detection algorithm using the extended Kalman filter (EKF) was proposed. The novelty in that algorithm lay in the joint adaptation of time delay estimates and bit estimates with the EKF, which differs from the Kalman filter used in this invention because the latter can be used only when time delays are assumed to be known.

SUMMARY OF THE INVENTION

A method for receiving a code-division division multiple-access (CDMA) signal combining symbol values spread by a plurality of spreading codes, which method comprises the steps of:

(a) converting the CDMA signal to a baseband signal;

(b) recognising symbol boundaries in every multipath for every user in the baseband signal to produce a delay estimate;

(c) estimating an attenuation and phase rotation impressed on the signal by each multipath to produce channel estimates;

(d) generating new symbol estimates for every user at a sampling rate that is greater than a symbol rate of the signal;

(e) generating an estimate of the received signal using said that is greater than a symbol rate of the signal symbol estimates and channel estimates;

(f) comparing the received signal with its estimate and feeding estimation error back to a means for estimating the transmitted symbols;

(g) sampling the symbol estimates at the estimated symbol boundaries of each user to obtain final symbol estimates; and (h) repeating steps (b) through (g) with every new sample.

A code division multiple access signal receiver comprising: means to receive a CDMA signal combining symbol values spread by a plurality of spreading codes; means to convert the CDMA signal to a baseband signal; means to recognise symbol boundaries in every multipath for every user in the baseband signal to produce a delay estimate; means to estimate an attenuation and phase rotation impressed on the signal by each multipath to produce channel estimates; means to generate new symbol estimates for every user at a sampling rate greater than a symbol rate of the signal; means to generate an estimate of the received signal using said symbol estimates and channel estimates; means to compare the received signal with its estimate and feed a estimation error back to a means for estimating the transmitted symbols; and means to sample the symbol estimates at the estimated symbol boundaries of each user to obtain a final symbol estimate.

Mobile communication channels change over time, and it is necessary to track these changes in order to maintain acceptable receiver performance. A multipath searcher is a device which constantly probes the channel to ensure that the strongest paths are being used in the receiver. Traditionally, it consists of one or more sliding correlators, which correlate the received signal with time-shifted versions of the spreading code of the desired user. The outputs of the correlators for all time delays within a specified range are recorded and, if the L strongest paths are to be used in the receiver, the delays corresponding to the L largest correlator outputs are selected.

In a multi-user CDMA system, the received signal is corrupted by MAI, and thus using it directly in a sliding correlator leads to poorer performance than in a single-user system.

Accordingly, another aspect of the present invention provides a method of multipath searching at the output of a receiver, comprising the steps of: respreading the estimated symbols transmitted by each user; summing the respread signals; subtracting the summed signal from the received signal to derive a residual error signal; and feeding the residual error signal to a bank of multipath searchers.

BRIEF DESCRIPTION OF THE DRAWINGS

In order that the present invention may be more readily understood, embodiments thereof will now be described, by way of example, with reference to the following drawings, in which.

DETAILED DESCRIPTION

Figure 1:
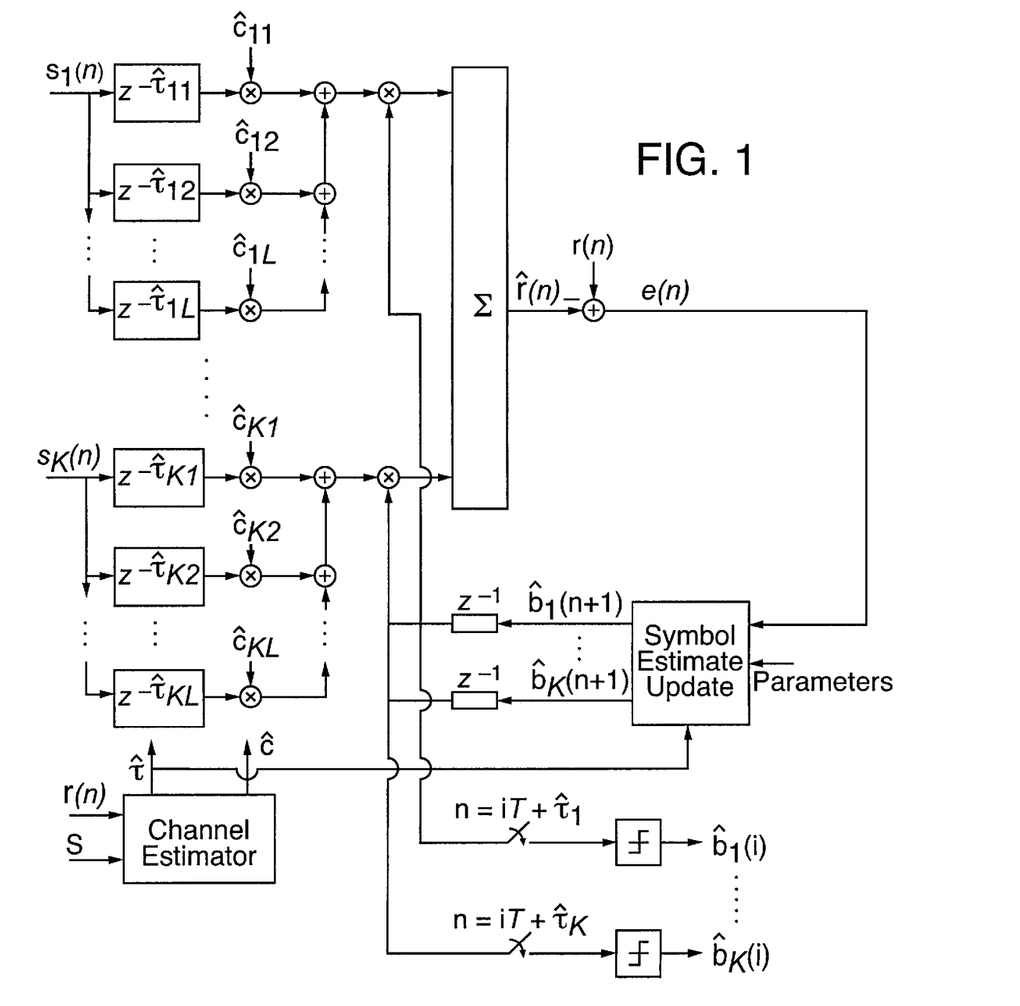
FIG. 1 is a schematic block diagram of a receiver structure embodying the present invention.

FIG. 1 shows a block diagram of a code division multiple access receiver structure embodying the present invention. The signal r(n) represents the nth sample of the continuous-time baseband received signal, sampled at a rate of $1/T_s$. From the following expression, an estimate may be obtained of r(n) and is expressed as $\hat{r}(n)$:

$$\hat{r}(n) = \sum_{k=1}^{K} \hat{b}_k(n) \sum_{l=1}^{L} \hat{c}_{kl} s_k(n - \hat{\tau}_{kl}) \tag{1}$$

where K denotes the number of active mobile users in the cell and L is the number of multipaths per user tracked at the receiver. The path delay estimates $\hat{\tau}_{kl}$ and complex channel coefficient estimates $\hat{c}_{kl}$ are assumed to have been obtained using an unspecified channel estimator and multipath searcher/tracker. $s_k(n)$ is the spreading code used by the kth user in the system and $\hat{b}_k(n)$ is an estimate of the symbol transmitted by the kth user in the system which contributes to the received signal at sample instant n.

The a priori estimation error $e(n)=r(n)-\hat{r}(n)$ is fed to a recursive update algorithm for $\hat{b}_k(n)$, which generates $\hat{b}_k(n+1)$, the next estimate of the transmitted symbol. The updating algorithm is designed to bring $\hat{b}_k(n)$ ever closer to $b_k(i)$, the true transmitted symbol which contributes to the received signal at the time n. (It is assumed that the largest path delay is much smaller than the symbol interval T). The index i denotes the ith symbol interval. In all such algorithms, parameters which govern its behaviour (such as step size, initial values, etc.) need to be specified, and these are identified together under "Parameters" in FIG. 1. Estimates of the multipath delays and complex coefficients may also be needed in the Symbol Estimate Update block, and this is therefore indicated in FIG. 1 as well.

Referring to FIG. 1, all time variables are in units of sampling interval, r(n) is the sampled received signal sequence, S represents the spreading codes of all users in the cell, $\hat{b}_k(i)$ is the symbol decision for the kth user in the ith symbol interval or epoch, $\hat{\tau}$ is a vector of multipath delay estimates, $\hat{c}$ is a vector of complex multipath coefficients, T is the symbol interval, $z^{-1}$ represents a one-sample delay, and $S_k(n)$ is the nth sample of the kth user's spreading waveform.

Because individual users are assumed to transmit in an asynchronous manner, symbol decisions are made at different times. For user k, $\hat{b}_k(n)$ is sampled at time $n=iT+\hat{\tau}_k$, where T is the symbol duration and $\hat{\tau}_k=\min(\hat{\tau}_{k1}, \ldots, \hat{\tau}_{kL})$, and the result fed to a slicer or memoryless decision device for symbol decoding. It should be noted that all time variables are normalised to the sampling interval. This process is depicted at the bottom of FIG. 1.

Figure 2A:
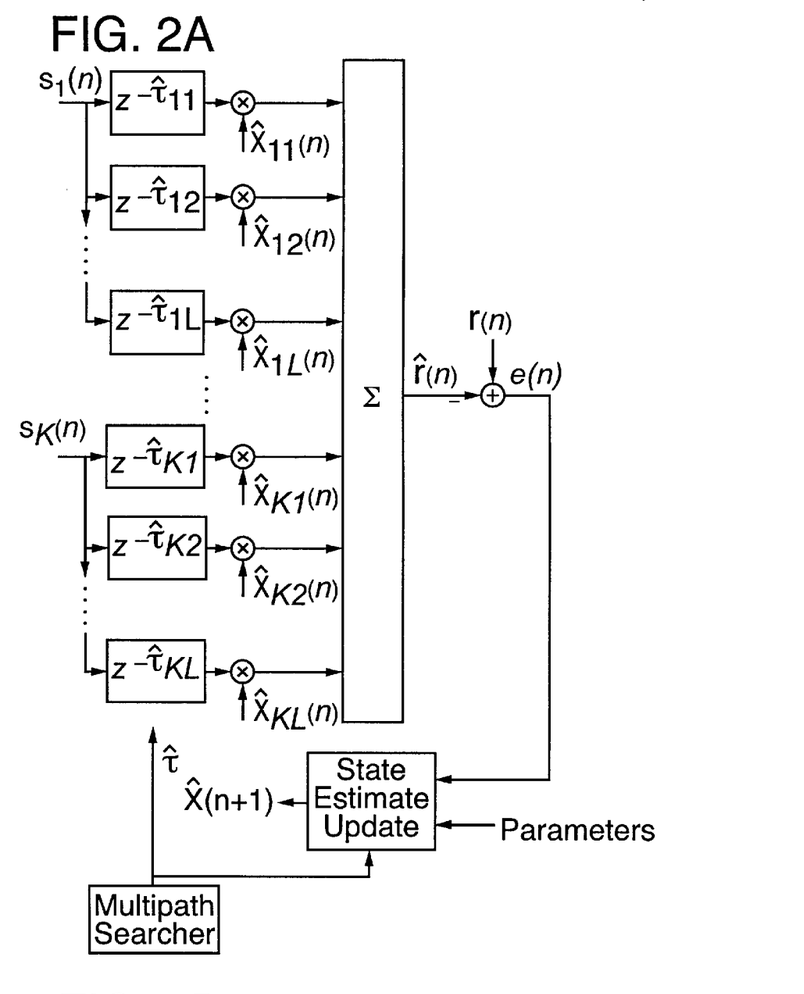
FIG. 2A is a schematic block diagram of another receiver structure embodying the present invention.

Another receiver structure embodying the present invention is shown in FIG. 2A. For this structure, it is not necessary to assume that the path delay are all much smaller than T. In this case, in place of the symbol estimate vector $\hat{b}(n)=[\hat{b}_1(n), \ldots, \hat{b}_K(n)]^T$, a state estimate vector is updated in the "State Estimate Update" block. The state estimate vector is:

$$\hat{x}(n)=[\hat{x}_{11}(n),\hat{x}_{12}(n), \ldots, \hat{x}_{k-1,L}(n),\hat{x}_{KL}(n)]^t.$$

Figure 2B:
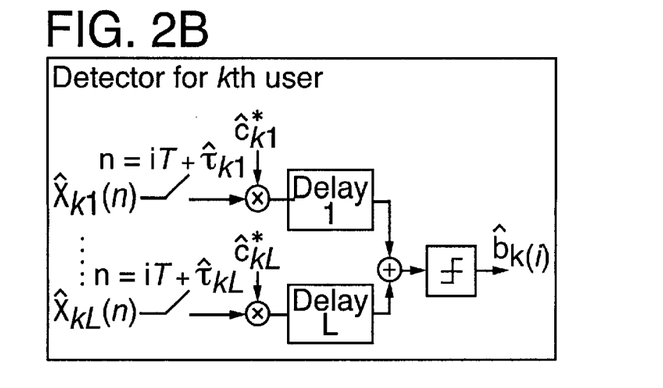
FIG. 2B is a maximal ratio combiner for use with the receiver structure of FIG. 2A.

Each element of the state vector is an estimate of one symbol-modulated path coefficient, e.g.

$$\hat{x}_{11}(n) \rightarrow b_1(n)c_{11}$$

and so forth. In this scheme, channel estimates $\hat{c}_{jk}$ are not required in the state estimate update algorithm, but are used for coherent demodulation in a maximal ratio combiner, as shown in FIG. 2B.

In both the receiver structures of FIGS. 1 and 2A, the key point is that a vector is recursively changed or updated in a systematic fashion, with the objective of getting progressively better estimates of the symbols that were transmitted by each user. Such an objective may be met by minimising either of the two following functions with respect to the vector $\hat{b}(n)$ or $\hat{x}(n)$ (depending on which receiver structure is used):

$$J_1(n)=E\|x(n)-\hat{x}(n)\|^2 \tag{2}$$

$$J_2(n)=E|r(n)-\hat{r}(n)|^2 \tag{3}$$

In (2), $\hat{x}(n)$ is understood to include both $\hat{x}(n)$ in FIG. 2A as well as $\hat{b}(n)$ in FIG. 1.

The differences between $J_1(n)$ and $J_2(n)$ are subtle but significant. Minimising $J_1(n)$ requires that information regarding the time variation of x(n) be known, or assumed; minimising $J_2(n)$ requires no such information. However, this is not to say that the former approach is inferior to the latter—in fact the opposite is true because minimising $J_1(n)$ admits a further degree of freedom in the modelling of the signal, which can be used to advantage as discussed below.

A large number of adaptive or recursive algorithms may be derived based on the minimisation of $J_1(n)$ or $J_2(n)$ in equations (2) and (3). Examples include stochastic steepest descent and recursive Gauss-Newton algorithms, already well known in the literature.

In this example, a Kalman filter-based algorithm is developed for use with the receiver structure of FIG. 1, assuming that binary phase shift keying (BPSK) modulation is employed.

The Kalman filter is a well-known tool in statistical detection and estimation theory, and has countless variants, which have been introduced either to improve numerical stability or computational efficiency. The most famous examples are the so-called "square root" Kalman filtering algorithms, which update a square-root factor of the covariance matrix P(n) instead of P(n) itself, in order to preserve the symmetry of this matrix.

Assuming that each of K users transmit over a multipath channel with L paths each and that the maximum path delay for any user is much smaller than the symbol interval T, the received signal is given by:

$$r(n) = \sum_{k=1}^{K}\sum_{l=1}^{L} c_{kl}\breve{b}_k(n)s_k(n-\tau_{kl}) + v(n) \quad (4)$$

$$= \left[\sum_{l=1}^{L} c_{1l}s_1(n-\tau_{1\lambda}) \cdots \sum_{l=1}^{L} c_{Kl}s_K(n-\tau_{K\lambda})\right] \cdot \begin{bmatrix}\breve{b}_1(n)\\ \vdots \\ \breve{b}_K(n)\end{bmatrix} + v(n)$$

$$= S(n)\hat{b}(n) + v(n)$$

where S(n) is a row vector of channel-modified spreading codes, $\breve{b}_k(n)$ is defined as $$\breve{b}_k(n) = \sum_{i=-\infty}^{\infty} b_k(i)u(n-iT-\tau_k),$$

$b_k(i)$ is the ith symbol transmitted by user k, u(n) is a unit pulse of duration T, $\tau_k$ is the smallest path delay for user k, $S_k(n)$ is the kth spreading code, $c_{kl}$ is the lth channel coefficient for the kth user, the $\tau_{kl}$ is the lth path delay in the kth channel. v(n) is white Gaussian noise of zero mean and variance $\sigma^2$.

It is apparent that $\breve{b}(n)=\breve{b}(n-1)$ except at symbol boundaries, i.e., when $n=iT+\tau_k, k=1, \ldots, K$. This time variation may be expressed concisely in the equation $$\breve{b}(n)=\breve{b}(n-1)+w(n-1) \quad (5)$$

where w(n) is equal to the zero vector except when $n=iT+\tau_k$, in which case it takes the values 0 and $[0, \ldots, 0, -2\breve{b}_k(n), 0, \ldots, 0]^T$ with equal probability. This point is easily verified by considering that $b_k(i+1)=b_k(i)$ or $-b_k(i)$ with equal probability.

The vector w(n) can therefore be seen as a non-stationary random vector with a covariance matrix at time n of:

$$Q(n) = E[w(n)w^T(n)] \quad (6)$$

$$= \begin{cases} 0 & \text{if } n \neq iT+\tau_k \\ \text{diag}(\underbrace{0, \ldots, 0}_{k-1}, 2\breve{b}_k^2(n), \underbrace{0, \ldots, 0}_{K-k}) & \text{if } n = iT+\tau_k \end{cases}$$

If it is assumed that w(n) is Gaussian and has zero mean, the Kalman filter can be used to iteratively determine the MMSE state estimates $\hat{b}(n)$, using the state-space models (5) and (4). The kth element of $\hat{b}(n)$ sampled at the bit boundaries would yield bit estimates for user k.

The recursive algorithm based on this description is summarised below. This algorithm requires that the relative time delays $\tau_{kl}$ and channel coefficients $c_{kl}$ are known, which is not an impractical requirement since code synchronisation and channel estimation are needed in all conventional CDMA receivers anyway.

Initialisation $P(0)=I$ $Q(0)=0$ $\hat{b}(0)=0$

Input parameters $\sigma^2$=Rough estimate of noise power

At each update, do:

$P(n):=P(n-1)+Q(n-1)$ $K(n):=P(n)S^T(n)/S(n)P(n)S^T(n)+\sigma^2]$ $P(n):=[I-K(n)S(n)]P(n)$ $\hat{b}(n+1):=\hat{b}(n)+K(n)[r(n)-S(n)\hat{b}(n)]$ This last section represents the steps needed in the Symbol Estimate Update block of FIG. 1.

Although the present example implementation assumes BPSK modulation, complex multilevel modulation schemes such as M-ary PSK, quadrature amplitude modulation (QAM), differential PSK, etc. can also be employed with suitable adjustments to the algorithm.

The receiver structure shown in FIG. 2A may also be used for multipath channel estimation i.e., the estimation of the complex multipath coefficients $c_{kl}, k=1, \ldots, K, l=1, \ldots, L$, which together with the path delays $\tau_{kl}$ constitute a mathematical model for the physical baseband channel. Data demodulation using the well-known Rake combiner as discussed in J. G. Proakis, Digital Communications, McGraw-Hill, 3rd edition, 1995 and most other more sophisticated receivers depends crucially on the availability of accurate channel estimates, and thus it is usually an important issue in a CDMA receiver.

Figure 3:
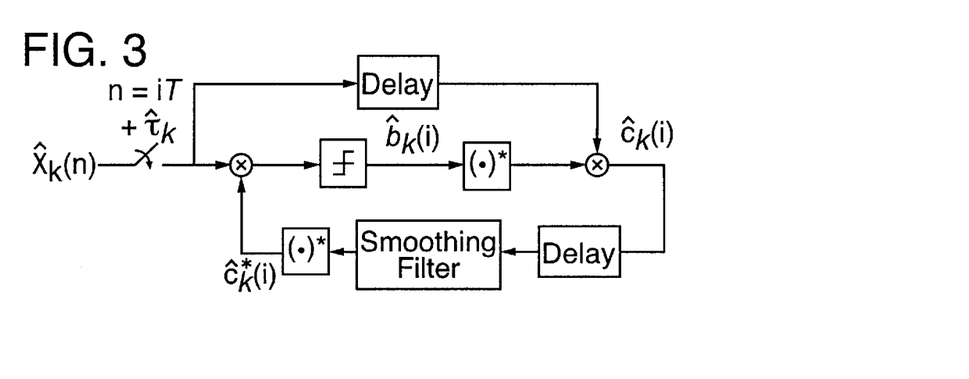
FIG. 3 is a schematic block diagram of a joint channel estimator and data demodulator for use with embodiments of the present invention.

To illustrate the concept, FIG. 3 depicts the proposed scheme for the kth user assuming transmission over a single-path channel, which necessitates the estimation of just one channel coefficient ck (t), in general a Rayleigh fading complex random variable and so slowly time-varying (hence the time index t). $\hat{x}_k(n)$ is the kth element of the state estimate vector $\hat{x}(n)$ generated using the Kalman filter or some other recursive algorithm. Sampling this high-rate (chip rate or higher) signal at the symbol boundaries i.e., when $n=iT+\hat{\tau}_k$ where $\hat{\tau}_k$ is the most recently available time delay estimate for this user, yields a signal which should in theory be close to the product of the channel coefficient and the symbol transmitted, $c_k(i)b_k(i)$. In writing this expression, it is assumed that $c_k$ is constant over one symbol interval, a valid assumption provided the maximum Doppler frequency is very much smaller than the symbol rate, a condition easily satisfied in practice.

The single-path channel model is easily extended to multipath models with known path delays.

Assuming the use of phase shift keying (PSK) with unit energy symbols (in other words the signal constellation consists of points which lie on the unit circle in the complex plane), multiplying $\hat{x}_k(n)$ with $b_k(i)^*$, where $(.)^*$ represents complex conjugation, at the symbol boundary $n=iT+\hat{\tau}_k$ should produce an estimate of $c_k(i)$. Of course, $b_k(i)$ is unknown except when pilot symbols are being transmitted. Outside the pilot-symbol intervals it is proposed to feed the estimated $b_k(i)$, denoted $\hat{b}_k(i)$, back in the manner shown in FIG. 3, to obtain the channel estimate $\hat{c}_k(i)$. To further improve the performance of the channel estimator, it is necessary to smooth the noisy estimates using some form of smoothing filter, such as a lowpass filter, a LS line-fitting filter or an adaptive linear predictor.

The delay block in the upper part of FIG. 3 represents the time taken to perform the hard-decision and complex conjugation operations, while the delay block in the lower half of that diagram is necessary to make the feedback loop realisable. Usually, the latter delay is taken to be one symbol interval.

In a multipath environment, the block diagram is different in that it would then be necessary to perform a Rake combining to obtain the symbol decision $\hat{b}_k(i)$. Apart from that, the mechanism of FIG. 3 for channel estimation in a single-path channel is identical to that used for individual coefficients in a multipath channel.

Simulation results are discussed below and demonstrate the performance of the proposed Kalman filter detector compared to the conventional matched-filter detector as well as to Chen and Roy's RLS discussion in D. S. Chen and S. Roy, "An adaptive multi-user receiver for CDMA systems", IEEE J. Sel. Areas Comms., vol. 12, no. 5, pp. 808–816, June 1994. Unless otherwise stated, the system has four users with relative delays of 0,1, 2 and 3 chips respectively, random codes are used, and the Kalman filter detector assumes an observation noise variance of $\sigma^2=0.4$.

$\sigma^2=0.1$ was also tried, but the results obtained were essentially identical to those using $\sigma^2=0.4$.

Figure 4:
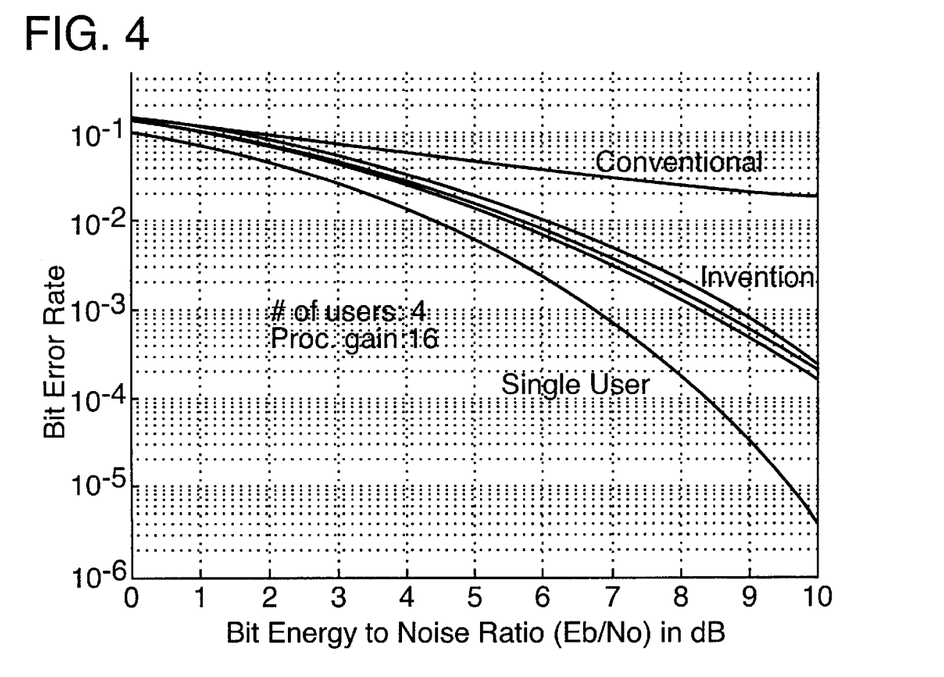
FIG. 4 shows bit error rate curves for a receiver structure embodying the present invention and a conventional detector in a four-user system with a processing gain of 16.

FIG. 4 shows bit error rate (BER) curves for the four users with a processing gain of 16, whose signals are received with identical power levels, using both the conventional detector and the proposed Kalman filter detector. The noise variance $\sigma^2$ used in the algorithm was 0.4 and the single-user bound is shown on the same figure for comparison. It is quite evident that the detector embodying the invention performs much better than the conventional detector, and its performance continues to improve with SNR even at 10 dB, whereas the performance of the conventional detector is already beginning to saturate at that SNR level.

Figure 5:
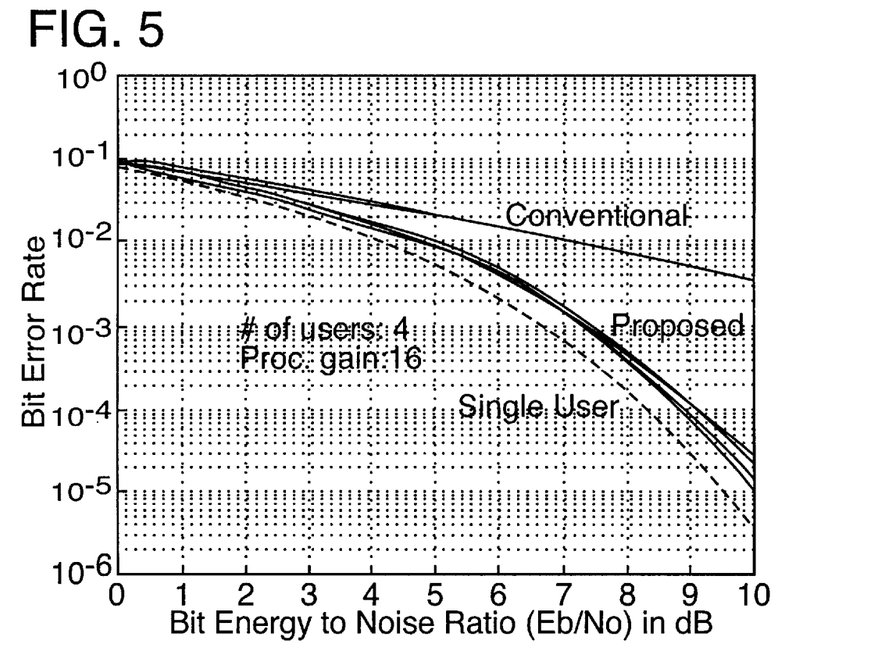
FIG. 5 shows bit error rate curves for a receiver structure embodying the present invention and a conventional detector in a four-user system with a processing gain of 32.

FIG. 5 presents BER curves obtained under identical conditions except that the processing gain has been increased to 32, to verify that the Kalman filter detector, although it does not perform the well-known despreading operation, does show improved performance with a larger processing gain.

Figure 6:
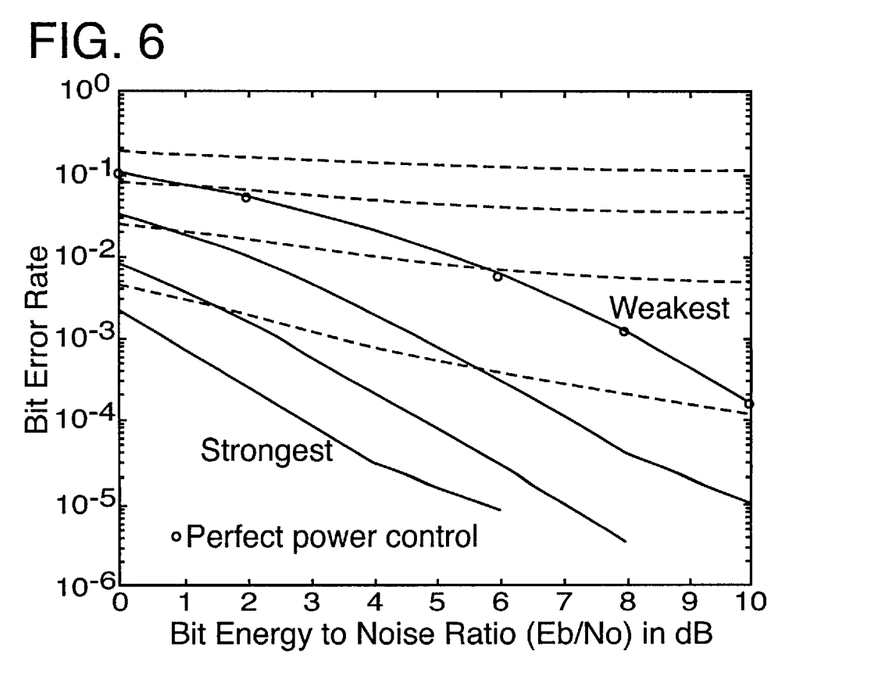
FIG. 6 shows bit error rate curves for a receiver structure embodying the present invention and for a conventional detector with a processing gain of 16.

FIG. 6 gives BER curves for the four users when the received signal power levels are 0, 3.5, 6 and 8 dB respectively. The processing gain is 16. The solid curves are results obtained using the Kalman filter, while the dashed ones come from the conventional detector. The circles mark the BER's of the first user when power control is perfect, and it is seen from the closeness of the circles to the first solid line that the detector embodying the present invention is effectively near-far resistant.

Figure 7:
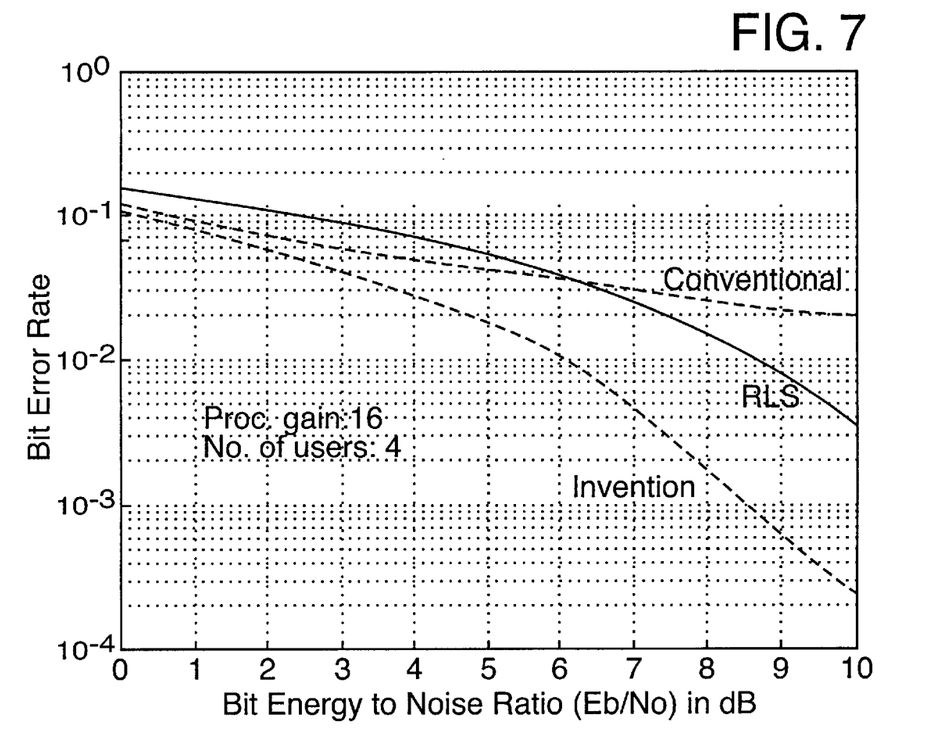
FIG. 7 shows bit error rate curves for an RLS detector, a conventional detector and a receiver structure embodying the present invention.

FIG. 7 compares the RLS detector discussed in 20 with the conventional detector and a Kalman filter detector embodying the present invention. It was found through many simulation trials that the forgetting factor 1 in the RLS algorithm does not affect the BER very significantly.

The results shown in FIG. 7 were produced using 1=0.995 The initial value of the inverse correlation matrix P was chosen to be the identity matrix. The relative delays between signals received from the four users were 0, 3, 6 and 9 chips respectively. The processing gain is 16. From FIG. 7 it is quite apparent that the RLS detector performs rather poorly, in fact under-performing even the conventional detector at low SNR's. But as already explained in the previous section, this is not too surprising considering that it is severely suboptimal when used in an asynchronous system.

Figure 8:
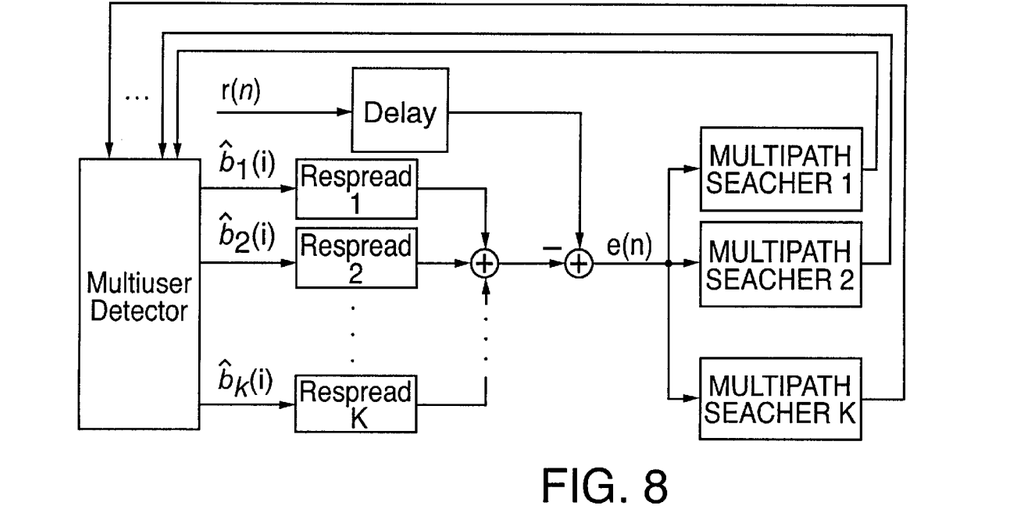
FIG. 8 is a schematic representation of a system embodying the present invention for multipath searching.
Figure 9:
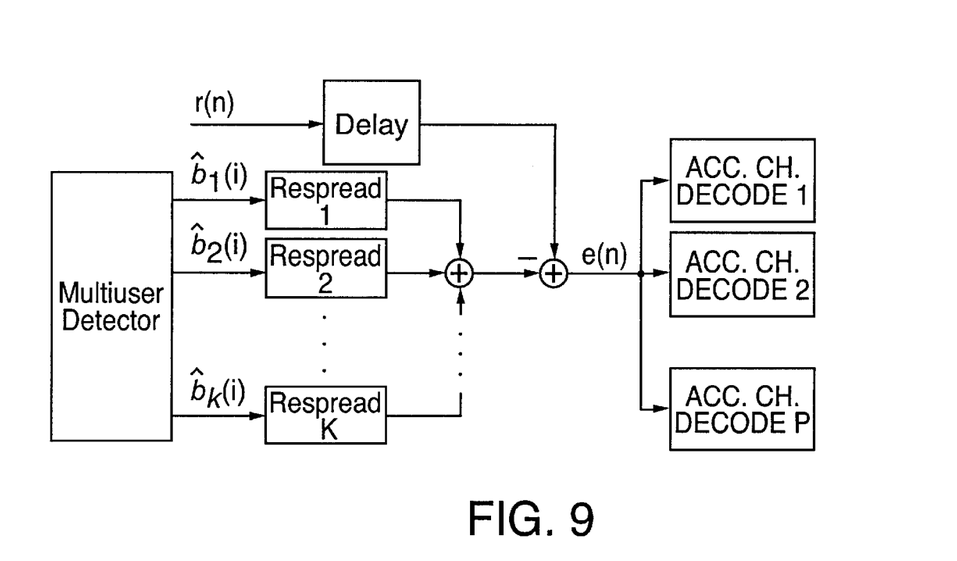
FIG. 9 is a schematic representation of a system embodying the present invention for decoding access channels.

Referring to FIGS. 8 and 9, a method for multipath searching is provided to solve the problems associated with the poor performance of sliding correlators. In the method, as shown schematically in FIG. 8, the following steps are utilised: the symbol estimates $\hat{b}_k(i)$, k=1, . . . , K, and remodulate (or respread) each one by the corresponding spreading code $s_k(n)$; add the respread signals together, and subtract the result from the received signal r(n) to form e(n); and use e(n) as the input to a bank of K conventional multipath searchers, one for each user.

This method makes use of the interference rejection capability of the proposed detector to provide a cleaner signal to the multipath searchers. Specifically, e(n) should contain only thermal noise when the channel multipath profile has not changed substantially from the last time channel estimation was performed. In this case, the searcher signals to the detector that there is no change in the channel. However, when the channel profile has changed significantly, the input to the searcher consists of the contribution from the new, uncancelled path as well as noise, but little MAI because it has mostly been cancelled by the proposed detector. The searcher will then tell the detector about the new path, and the detector should then act on that information appropriately.

Referring to FIG. 9, the idea of generating a residual error signal e(n) may also be used for improved access channel decoding. The P access channel(s) on the reverse link of a cellular system are used for initial establishment of the link between a new mobile user and the base station, and are shared by all users. Correct demodulation of the access channel(s) at the base station is vital in order that new users may be added to the base station's list of active mobile stations. But again, access channels are also affected by MAI. Each access channel may be treated as an additional user inside a multi-user detector, but this only adds to complexity and is an inefficient use of resources since the access channel is not very heavily loaded, relative to the load carried on the traffic channels.

The cancellation of all active users' traffic channel signals from the received signal leaves behind only the access channel signals, which can then be demodulated with a higher degree of reliability than using the received signal itself.

What is claimed is:

1. A method for receiving a code-division multiple-access (CDMA) signal combining symbol values spread by a plurality of spreading codes, which method comprises the steps of:

(a) converting the CDMA signal to a baseband signal;

(b) recognising symbol boundaries in every multipath for every user in the baseband signal to produce a delay estimate;

(c) estimating an attenuation and phase rotation impressed on the signal by each multipath to produce channel estimates;

(d) generating new symbol estimates for every user at a sampling rate that is greater than a symbol rate of the signal;

(e) generating an estimate of the received signal using said symbol estimates and channel estimates;

(f) comparing the received signal with its estimate and feeding estimation error back to a means for estimating the transmitted symbols;

(g) sampling the symbol estimates at the estimated symbol boundaries of each user to obtain final symbol estimates; and (h) repeating steps (b) through (g) with every new sample.

2. A method according to claim 1, wherein the channel estimates are used only in the symbol demodulation.

3. A method according to claim 1, wherein the symbol estimates are generated using a Kalman filter.

4. A method according to claim 1, wherein the delay and channel estimation steps are performed at an update rate other than the sampling rate.

5. A method according to claim 4, wherein an update rate lower than the sampling rate is used.

6. A method according to claim 1, wherein the modulation scheme is not BPSK.

7. A method according to claim 1, wherein a state estimate vector $\hat{b}(n)$ or $\hat{x}(n)$ is re-initialised at the symbol boundaries.

8. A method for receiving a code-division multiple-access (CDMA) signal combining symbol values spread by a plurality of spreading codes, which method comprises the steps of:

(a) converting the CDMA signal to a baseband signal;

(b) recognising symbol boundaries in every multipath for every user in the baseband signal to produce a delay estimate;

(c) estimating an attenuation and phase rotation impressed on the signal by each multipath to produce channel estimates;

(d) generating new symbol estimates for every user at a sampling rate;

(e) generating an estimate of a received signal using said symbol estimates and channel estimates;

(f) comparing the received signal with its estimate and feeding an estimation error back to a means for estimating the transmitted symbols;

(g) sampling the symbol estimates at the estimated symbol boundaries of each user to obtain final symbol estimates;

(h) repeating steps (b) through (g) with every new sample; and multipath searching at output of a receiver, the multipath searching comprising the steps of:

respreading estimated symbols transmitted by each user to derive respread signals;

summing the respread signals to derived a summed signal;

subtracting the summed signal from the received signal to derive a residual error signal; and feeding the residual error signal to a bank of multipath searchers.

9. A method according to claim 8, wherein each of the multipath searchers in the bank of multipath searchers comprises one or more sliding correlators.

10. A method according to claim 8, comprising the step of access channel demodulation at the output of the receiver, which method comprises the steps of respreading the estimated symbols transmitted by each user to derive respread signals;

summing the respread signals to derive a summed signal;

subtracting the summed signal from the received signal to derive a residual error signal; and then correlating with the spreading code used on the access channel.

11. A code division multiple access signal receiver comprising:

means to receive a CDMA signal combining symbol values spread by a plurality of spreading codes;

means to convert the CDMA signal to a baseband signal;

means to recognise symbol boundaries in every multipath for every user in the baseband signal to produce a delay estimate;

means to estimate an attenuation and phase rotation impressed on the signal by each multipath to produce channel estimates;

means to generate new symbol estimates for every user at a sampling rate greater than a symbol rate of the signal;

means to generate an estimate of the received signal using said symbol estimates and channel estimates;

means to compare the received signal with its estimate and feed an estimation error back to a means for estimating the transmitted symbols; and means to sample the symbol estimates at the estimated symbol boundaries of each user to obtain a final symbol estimate.

12. A method according to claim 1, comprising the step of access channel demodulation at the output of the receiver, which method comprises:

respreading estimated symbols transmitted by each user to derive respread signals;

summing the respread signals the derive a summed signal;

subtracting the summed signal from the received signal to derive a residual error signal; and correlating with the spreading code used on the access channel.

13. The method of claim 1 wherein the new symbol estimates are successively improved.

14. The method of claim 1 wherein the new symbol estimates are successively closer to the transmitted symbols.

15. The method of claim 8 wherein the sampling rate is greater than a symbol rate of the signal.

16. The method of claim 9 wherein the sampling rate is greater than a symbol rate of the signal.

17. The method of claim 10 wherein the sampling rate is greater than a symbol rate of the signal.

* * * * *

UNITED STATES PATENT AND TRADEMARK OFFICE
CERTIFICATE OF CORRECTION

PATENT NO. : 6,240,099 B1
DATED : May 29, 2001
INVENTOR(S) : Lim et al.

It is certified that error appears in the above-identified patent and that said Letters Patent is hereby corrected as shown below:

Title page,
Item [56], under OTHER PUBLICATIONS, "Minimization Probability of Error" should read -- Minimum Probability of Error --.

Column 3,
Line 64, "code-division division" should read -- code-division --.

Column 4,
Line 12, delete "that is greater than a symbol rate of the signal".
Line 35, "feed a estimation" should read -- feed an estimation --.

Column 6,
Line 10, "$\tau\hat{}kl$" should read -- $\tau\hat{}kL$ --.
Line 23, "(n)]'" should read -- $(n)]^T$ --.

Column 8,
Line 8, "$K(n):=P(n)S^T(n)/S(n)\,P(n)S^T(n)+\sigma^{2]}$" should read -- $K(n):=P(n)S^T(n)/[S(n)\,P(n)S^T(n)+\sigma^2]$ --.

Column 9,
Line 52, "factor 1" should read -- factor $\lambda$ --.
Line 54, "1=0.995" should read -- $\lambda$=0.995. --.

Column 11,
Line 39, "derived" should read -- derive --.

UNITED STATES PATENT AND TRADEMARK OFFICE
CERTIFICATE OF CORRECTION

PATENT NO.    : 6,240,099 B1
DATED         : May 29, 2001
INVENTOR(S)   : Lim et al.

It is certified that error appears in the above-identified patent and that said Letters Patent is hereby corrected as shown below:

Column 12,
Line 35, "signals the derive" should read -- signals to derive --

Signed and Sealed this

Twenty-seventh Day of August, 2002

Attest:

Attesting Officer

JAMES E. ROGAN
Director of the United States Patent and Trademark Office